(12) United States Patent
Lannert et al.

(10) Patent No.: US 7,314,411 B2
(45) Date of Patent: Jan. 1, 2008

(54) PLAYER ACTION INCENTIVE ARRANGEMENT FOR GAMING SYSTEMS

(75) Inventors: Robert F. Lannert, Broken Arrow, OK (US); Brendan M. O'Connor, Austin, TX (US); Joseph R. Enzminger, Austin, TX (US); Gary L. Loebig, Austin, TX (US); Clifton E. Lind, Austin, TX (US); Jefferson C. Lind, Austin, TX (US)

(73) Assignee: Multimedia Games, Inc., Austin, TX (US)

( * ) Notice: Subject to any disclaimer, the term of this patent is extended or adjusted under 35 U.S.C. 154(b) by 106 days.

(21) Appl. No.: 10/982,169

(22) Filed: Nov. 5, 2004

(65) Prior Publication Data

US 2005/0221881 A1 Oct. 6, 2005

Related U.S. Application Data

(60) Provisional application No. 60/558,684, filed on Apr. 1, 2004.

(51) Int. Cl.
*A63F 9/24* (2006.01)
(52) U.S. Cl. ....................................... 463/19
(58) Field of Classification Search ............. 463/19
See application file for complete search history.

(56) References Cited

U.S. PATENT DOCUMENTS

| | | | | |
|---|---|---|---|---|
| 4,252,322 A | * | 2/1981 | Orter | 273/269 |
| 4,743,024 A | * | 5/1988 | Helm et al. | 273/143 R |
| 5,351,970 A | * | 10/1994 | Fioretti | 463/19 |
| 5,827,119 A | * | 10/1998 | Bromley | 463/7 |
| 6,238,288 B1 | | 5/2001 | Walker et al. | |
| 6,254,483 B1 | | 7/2001 | Acres | |
| 6,569,017 B2 | | 5/2003 | Enzminger et al. | |
| 6,764,397 B1 | | 7/2004 | Robb | |
| 2002/0132661 A1 | | 9/2002 | Lind et al. | |
| 2002/0132666 A1 | | 9/2002 | Lind et al. | |
| 2004/0048647 A1 | | 3/2004 | Lind et al. | |
| 2004/0152499 A1 | | 8/2004 | Lind et al. | |

* cited by examiner

*Primary Examiner*—Corbett B. Coburn
(74) *Attorney, Agent, or Firm*—Russell D. Culbertson; The Culbertson Group, P.C.

(57) ABSTRACT

A processing device measures the time it takes for a player to take some action in a game and bases the award or result in the game for the player at least in part on that measured time. A player receives a more desirable result or outcome for a particular game play in response to a shorter player action time and/or receives a less desirable result or outcome for a particular game play in response to a longer player action time. Providing more desirable results for shorter player action times or less desirable results for longer player action times provides players an incentive that influences them to take the appropriate player actions more quickly.

21 Claims, 6 Drawing Sheets

PLAYER ACTION INCENTIVE ARRANGEMENT FOR GAMING SYSTEMS

CROSS-REFERENCE TO RELATED APPLICATION

The Applicants claim the benefit, under 35 U.S.C. § 119(e), of U.S. Provisional Patent Application No. 60/558,684 filed Apr. 1, 2004 and entitled "PLAYER ACTION INCENTIVE ARRANGEMENT FOR GAMING SYSTEMS." The entire content of this provisional application is incorporated herein by this reference.

TECHNICAL FIELD OF THE INVENTION

This invention relates to electronic gaming systems such as bingo games, for example. More particularly, the invention is directed to apparatus, methods, and program products for providing a player with incentives to quickly take required player actions to facilitate consistently rapid completion of the games in a gaming system.

BACKGROUND OF THE INVENTION

There are situations particularly in multi-player games where the participants are required to take certain actions in the course of the game. The game generally referred to as "bingo" is an example of a game in which participants may be required to take some action in order to complete a game that has been initiated. Bingo is played with predetermined bingo cards that include a number of designations randomly arranged in a grid or other layout of spots or locations. The bingo cards may be physically printed on paper or another suitable material, or may be represented by a data structure that defines the various card locations and designations associated with the locations. In the traditional bingo game sequence, a number of the predetermined bingo cards are first put in play for a particular game and then designations are randomly selected from a pool of available designations and matched to the designations on each bingo card that is in play in the game. This matching of bingo designations randomly selected for a game and bingo designations associated with a card in play in the game is commonly referred to as daubing the card and results in a pattern or arrangement of matched spots or card locations. The player first achieving a particular game ending pattern of matched card locations and then taking some action to announce or claim the win is considered the winner of the bingo game. Generally, bingo designations continue to be randomly selected and announced to players until one of the players achieves the game ending pattern and then takes the required action to claim the prize. That is, the game can only end if one of the participants takes the required action or actions to claim the win. Even players that do not achieve the game ending pattern in the bingo game may be required to take some action either to claim a consolation prize or for some other reason.

The requirement that a player take some affirmative action in order to complete the game can pose problems particularly in electronic implementations of bingo games which are intended to facilitate rapid play. If a player in a bingo game fails to take the required action in order to claim the win for the game ending pattern or is slow to take the required action, the game continues on longer than necessary. Thus, all the players in the game must wait longer than necessary to obtain the results of their participation in the game. This delay in obtaining results can cause dissatisfaction with the game and prompt players to move on to other, competing games or gaming systems.

SUMMARY OF THE INVENTION

The present invention provides apparatus, methods, and program products for conducting games in a way that may reduce undesirable delays introduced by slow players or players that fail to take specific actions required by the game. In particular, the present invention involves measuring the time it takes for a player to take some action in a game and basing the award or result in the game for the player at least in part on that measured time. The invention generally provides incentives for players to take actions more quickly in the course of the games and thus provides the potential for faster overall play of games.

Several definitions will be helpful in describing the invention. A "game ending pattern" is defined as a number of daubed card locations arranged in a particular pattern that has been defined as the pattern that, once achieved for any bingo card or card representation in play, ends the particular bingo game. Each "game ending pattern" is associated with a corresponding "game ending result." In addition, a "player action," as used in this disclosure, is defined as any action that a player may or must make in order to continue play in a game or claim the final result or prize in a game. Daubing a player's bingo card(s) and/or operating an input device to claim a win or prize are examples of player actions in a bingo game. The point in a game where a player may or must take some action in order to proceed in the game is referred to in this disclosure as a "player action event." "Player action time" is the amount of time that elapses between the player action event and the point in time that the player completes the player action. Finally, "action incentives" are defined as anything that may be employed to influence a player in a game to take a player action.

A method according to the present invention includes monitoring for player action events and then measuring a player action time in response to a player action event. A result or outcome for the game for a particular player is then based at least in part on the player action time. Generally, the invention provides a more desirable result or outcome for a particular game play in response to a shorter player action time and/or provides a less desirable result or outcome for a particular game play in response to a longer player action time. Providing more desirable results for shorter player action times or less desirable results for longer player action times provides players an incentive that influences them to take the appropriate player actions more quickly. Prompting or influencing players to take actions more quickly generally reduces the time required to complete a given game, thereby enhancing the gaming experience for all participants in the game.

Although the invention is not limited to any particular type of gaming system, the invention has particular application in multi-player, wagering gaming systems in which players compete against each other in one or more wagering-type games. A particular multi-player gaming system embodying the principles of the invention includes a number of electronic player stations and at least one server in communication with each electronic player station. Each electronic player station may be used by a player to produce or initiate a game play request to participate in a multi-player game. The server or servers collect the game play requests into a game play group and then conduct the game once sufficient game play requests have been collected. The server and/or respective player stations monitor for player action events, and, once such an event is detected, monitors or measures the player action time for responding to the event. The server or player station ultimately uses the player action time in determining or setting the award or prize for the respective player. Awards or prizes may be influenced by a single player action or by cumulative player actions over the course of a single game or several separate games. In preferred forms of the invention, a processing device associated with the player station measures the player action time and reports that time to the server. A processing device associated with the server then uses the player action time information in setting or determining the respective player's award or result for the game play.

All of the functions performed by the various processing devices in the gaming system are preferably performed under the control of suitable program code. Thus, the invention includes a program product for controlling or directing the various hardware functions. A program product embodying the principles of the invention may include action incentive code and player action time monitoring code. The action incentive code is executed to present action incentives to the player associated with the player action event at the corresponding electronic player station. The player action time monitoring code detects when a player action event occurs, measures the time a player takes to complete the player action, and makes the player action time available to the action incentive program code. The action incentive program code uses the player action time in determining or setting the result or award for the game for that player.

These and other advantages and features of the invention will be apparent from the following description of the preferred embodiments, considered along with the accompanying drawings.

DESCRIPTION OF PREFERRED EMBODIMENTS

Various advantages and features of the invention together with preferred modes of use of the invention will best be understood by reference to the following description of illustrative embodiments read in conjunction with the accompanying drawings. The following description discusses the invention as used in a bingo gaming system, in particular, the bingo gaming system disclosed in U.S. patent application Ser. No. 10/456,721, published as U.S. Patent Application Publication No. 2004/0152499 A1 on Aug. 5, 2004, and entitled, "Method, System, and Program Product for Conducting Multiple Concurrent Bingo-Type Games," the entire content of which has been incorporated herein by reference above. Although the invention does have particular application in bingo gaming systems, it will be appreciated that the invention is by no means limited to use in bingo gaming systems. Rather, the invention has application in any gaming system, particularly any wagering-type gaming system, in which it is desirable for the player or players to take some action or series of actions quickly in the game.

Figure 1:
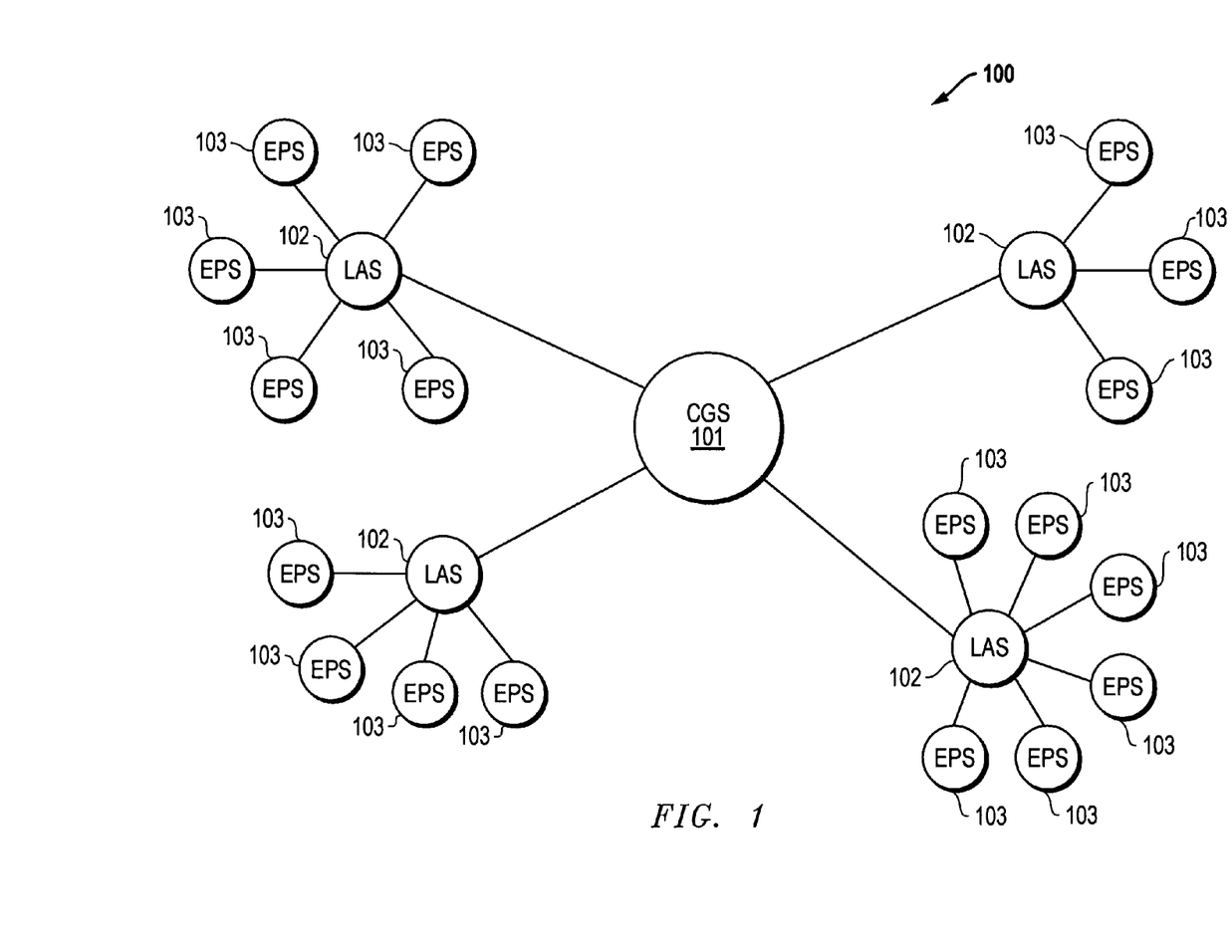
FIG. 1 is a high level diagrammatic representation of a bingo gaming system embodying the principles of the present invention.

FIG. 1 shows a gaming system 100 including a central game server (CGS) 101 that cooperates with a number of other components to enable players, preferably at many different remote gaming sites, to participate in bingo games. Each gaming site includes a local area server (LAS) 102 and a number of electronic player stations (EPSs) 103. As will be discussed in detail below, in the normal operation of gaming system 100, a player at any EPS 103 in the system may participate in a given bingo game with players at any other EPSs 103 in the system. Thus, players at different gaming facilities may be grouped together for a given game administered through system 100. Grouping together players from different gaming facilities for the play of a bingo game allows different bingo games to be played rapidly and minimizes the time that players must wait to receive the result of their participation in the game.

System 100 includes an arrangement for grouping players and/or game play requests for the play of a single game to facilitate rapid play. This player grouping arrangement reduces the time between a game play request at one of the EPSs 103 and the return of results to the respective EPS sufficiently to allow a great deal of flexibility in how results in the game are displayed to the player. In particular, the game results may be displayed in some manner unrelated to the underlying bingo game. For example, the bingo game results may be mapped to a display traditionally associated with a reel-type game (slot machine), to a display relating to a card game, or to a display showing a race such as a horse or dog race. Preferred techniques for mapping bingo game results to displays associated with games or contests unrelated to bingo are described in U.S. patent application Ser. No. 10/060,643, published as U.S. Patent Application Publication No. 2002/01324661 A1 on Sep. 19, 2002, and entitled "Method, Apparatus, and Program Product for Presenting Results in a Bingo-Type Game." The entire content of this prior application is incorporated herein by this reference.

System 100 rapidly groups players and/or game play requests and starts one game after another so that multiple games may be in play at any given time. That is, once a first group of players or game play requests has been assigned to a game offered through system 100, the system proceeds to simultaneously administer a game for the first group of players or game play requests and also begin grouping players or game play requests for a next game. System 100 does not necessarily wait for one game to be completed before starting to collect players or game play requests for, and actually beginning play in, the next game. The number of players or game play requests grouped for the play of games according to the present invention may be limited to reduce the time required for grouping. For example, each game offered through gaming system 100 shown in FIG. 1 may be limited to between 2 to 20 players or game play requests, with the preferred number for any given game being from 10 to 15. Where system 100 includes numerous EPSs 103 at the various remote locations, on the order of several thousand EPSs for example, hundreds of individual games may be in progress at any given time through the gaming system.

Regardless of the rapid play facilitated by system 100 and regardless of the manner in which the game results are displayed, for purposes of example, the underlying game remains a standard bingo game played in the traditional sequence of play for bingo games. That is, each player obtains or is assigned a bingo card or bingo card representation, all bingo cards in play in the game are daubed or checked for matches with a randomly generated sequence of designations (for example, designations produced in a ball draw or produced by a random number generator), and the first card in the game to match the sequence of designations to produce the game ending pattern wins the bingo game. Additional prizes may be awarded for other patterns that may be produced in the course of the bingo game. The mapping of different prizes to various bingo patterns that may be produced in the course of a bingo game in system 100 may be accomplished as described in U.S. Pat. No. 6,569,017 B2, entitled "A Method for Assigning Prizes in Bingo-Type Games" or U.S. patent application Ser. No. 10/238,313, published as U.S. Patent Application Publication No. 2004/0048647 A1 on Mar. 11, 2004, and entitled "A Prize Assignment Method and Program Product for Bingo-Type Games." The entire content of each of these documents is incorporated herein by this reference.

Figure 2:
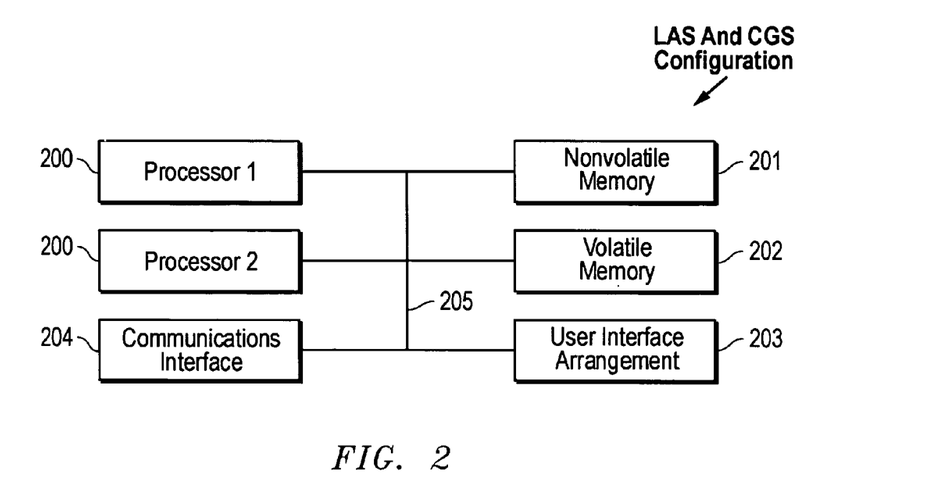
FIG. 2 is a diagrammatic representation of a computer system arrangement that may be used for the central game server and local area servers included in the system shown in FIG. 1.

CGS 101 may comprise a computer system such as the basic system shown in FIG. 2. The basic system may include one or more processors 200, nonvolatile memory 201, volatile memory 202, a user interface arrangement 203, and a communications interface 204, all connected to a system bus 205. It will be appreciated that user interface arrangement 203 may include a number of different devices such as a keyboard, a display, and a pointing device such as a mouse or trackball for example, although not shown in FIG. 2. Alternatively to the integrated user interface arrangement 203 shown in FIG. 2, a user interface for CGS 101 may be provided through a separate computer (not shown) in communication with the CGS. Regardless of the particular configuration for CGS 101, in the normal operation of system 100 shown in FIG. 1 within the context of a bingo game, the CGS functions to group players for participation in bingo games offered through the system, produces or obtains sequences of bingo designations for the play of the bingo games, checks for or identifies the results in the games, and communicates the results to LASs 102. Specific processes performed by CGS 101 to provide these functions will be described below with reference to FIG. 6.

As used in this disclosure, any sequence of designations that may be matched against bingo cards or card representations in the present gaming system will be referred to as a ball draw regardless of how the sequence is actually generated. Under this definition, it will be appreciated that a ball draw may be produced by a random number generator, a pseudo random number generator, or any other suitable device or system, and not necessarily a physical ball draw device.

Each LAS 102 included in system 100 as shown in FIG. 1 may comprise a computer system having the same basic structure as shown in FIG. 2. That is, each LAS 102 may include one or more processors 200, nonvolatile memory 201, volatile memory 202, user interface arrangement 203, and communications interface 204 all connected to system bus 205. As with CGS 101, the user interface for the respective LAS 102 may be provided through a separate computer in communication with the LAS rather than the integrated user interface arrangement 203 shown in FIG. 2. Regardless of the specific configuration of the LAS, each LAS serves, in normal operation of the system shown in FIG. 1, to transfer or relay information from its respective EPSs 103 to CGS 101 and transfer or relay information from the CGS to the LAS's respective EPSs. Each LAS according to the present invention may also have the ability to group players and actually play games in certain situations. For example in a bingo game, where one LAS 102 serves a large number of EPSs 103, the LAS may group players or game play requests from its respective EPSs during a time of high player activity, obtain or produce a ball draw, identify results, and return results to the EPSs rather than having the CGS 101 perform these tasks. Also, each LAS 102 shown in FIG. 1 may be configured to perform the tasks normally performed by CGS 101 in the event the communications link between the respective LAS and CGS is degraded below a certain level or is severed altogether. Specific processes that may be performed by LASs 102 according to the invention will be described below with reference to FIG. 5.

Figure 3:
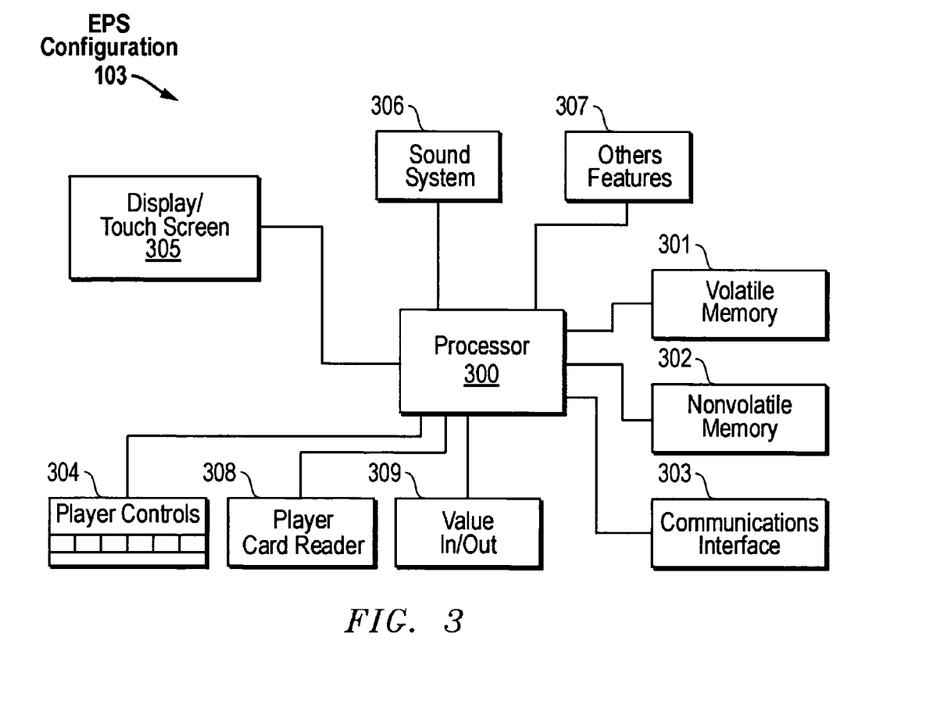
FIG. 3 is a diagrammatic representation of an electronic player station that may be used in the system shown in FIG. 1.

FIG. 3 shows an example of an EPS 103 that may be used in a gaming system embodying the principles of the present invention. The illustrated EPS 103 includes a processor 300, volatile memory 301, nonvolatile memory 302, and a communications interface 303. The volatile and nonvolatile memory stores computer program code that may be executed by processor 300 to cause the processor to perform or direct the various functions provided by EPS 103. Communications interface 303 allows communications between EPS 103 and its respective LAS 102 and/or CGS 101. EPS 103 also includes a special user interface arrangement to facilitate player participation in games offered through gaming system 100 shown in FIG. 1, and display results in an exciting and attractive format. This interface includes player controls 304, a display or touch screen display 305, a sound system 306, and perhaps other features 307 such as alarms or special displays or alerting devices. Each EPS 103 also preferably includes a convenient system for allowing the player to input player-specific information and for receiving wagers and dispensing winnings. For example, the EPS 103 shown in FIG. 3 includes a player account card reader 308 that is adapted to read player-specific information from a player account card inserted into the reader. A player account card may include player information or simply a player identifier encoded on a magnetic medium (mag stripe) associated with the card, or encoded on bar code, or a memory device associated with the player account card. The illustrated EPS 103 also includes a device 309 for receiving value and issuing value in the course of play. This device may accept currency, vouchers, or tokens, for example, and also output currency, vouchers, or tokens. Of course a separate device may be used to receive and issue value for games played according to the present invention. Alternatively or in addition to value in/out device 309, EPSs 103 may read player account information from the player card or player information otherwise input at the EPS, and account for wagers and winnings in the manner set out in U.S. patent application Ser. No. 10/044,478, published as U.S. Patent Application Publication No. 2002/0132666 A1 on Sep. 19, 2002 and entitled "A Distributed Account Based Gaming System," the entire content of which is incorporated herein by this reference. It will be appreciated that the particular configuration of devices shown in FIG. 1 is shown only for purposes of example. A gaming system according to the present invention may omit some or all of the separate LAS's 102 at the various gaming facilities so that the EPSs 103 communicate directly with CGS 101. Also, various regions or different gaming facilities may be divided up into separate systems each having a respective CGS such as CGS 101. In these situations the system could be configured such that a single EPS 103 may be serviced by any of the CGSs. Furthermore, a gaming system embodying the principles of the invention may include multiple CGSs rather that a single CGS 101 as shown in FIG. 1.

With regard to the example EPS 103 shown in FIG. 3, it will be noted that display 305 is shown as being directly controlled through processor 300. It will be appreciated that other forms of EPSs that may be used in the present invention may include one or more separate video processors dedicated to driving the display or displays. Regardless of the particular hardware configuration used for an EPS 103, the invention preferably includes some facility or arrangement for detecting when a player action event has occurred and measuring the time between the player action event and the player action responding to the player action event. Commonly, this measuring of player action time will involve measuring the time between the point at which a certain graphic display is presented to, or produced for, the player and the time that the player operates an appropriate input device in response to the graphic display. For example, in the bingo gaming system shown in FIG. 1, each EPS 103 involved in a given bingo game may produce a "DAUB NOW" display indicating to the player that they must make a suitable daub input to continue the game. Producing this "DAUB NOW" display represents a player action event at the respective EPS. Each respective EPS measures the time between this player action event and the time that the player makes an appropriate daub input. This time represents a player action time in the game. In this example, software associated with processor 300 or some other processor driving display 305 may start a clock at the time the signals, commands, or codes are sent to the display 305 to produce the "DAUB NOW" graphic, and stop the clock in response to the player's appropriate input. Alternatively, the software could start the clock when the processor executes some command or code that ultimately results in the "DAUB NOW" graphic, regardless of when the display is actually driven to produce the graphic. These two alternatives are simply two examples of arrangements for detecting or indicating player action time within the scope of the present invention.

In the following description of FIG. 4 and the other process flowcharts in this disclosure, it will be appreciated that the references to the physical components are references to the diagrams in FIGS. 1, 2, and 3 that show those components. The components, such as EPSs 103, LASs 102, and CGS 101 discussed with reference to the flowcharts are generally not shown in the flowcharts themselves but are shown particularly in FIG. 1.

Figure 4:
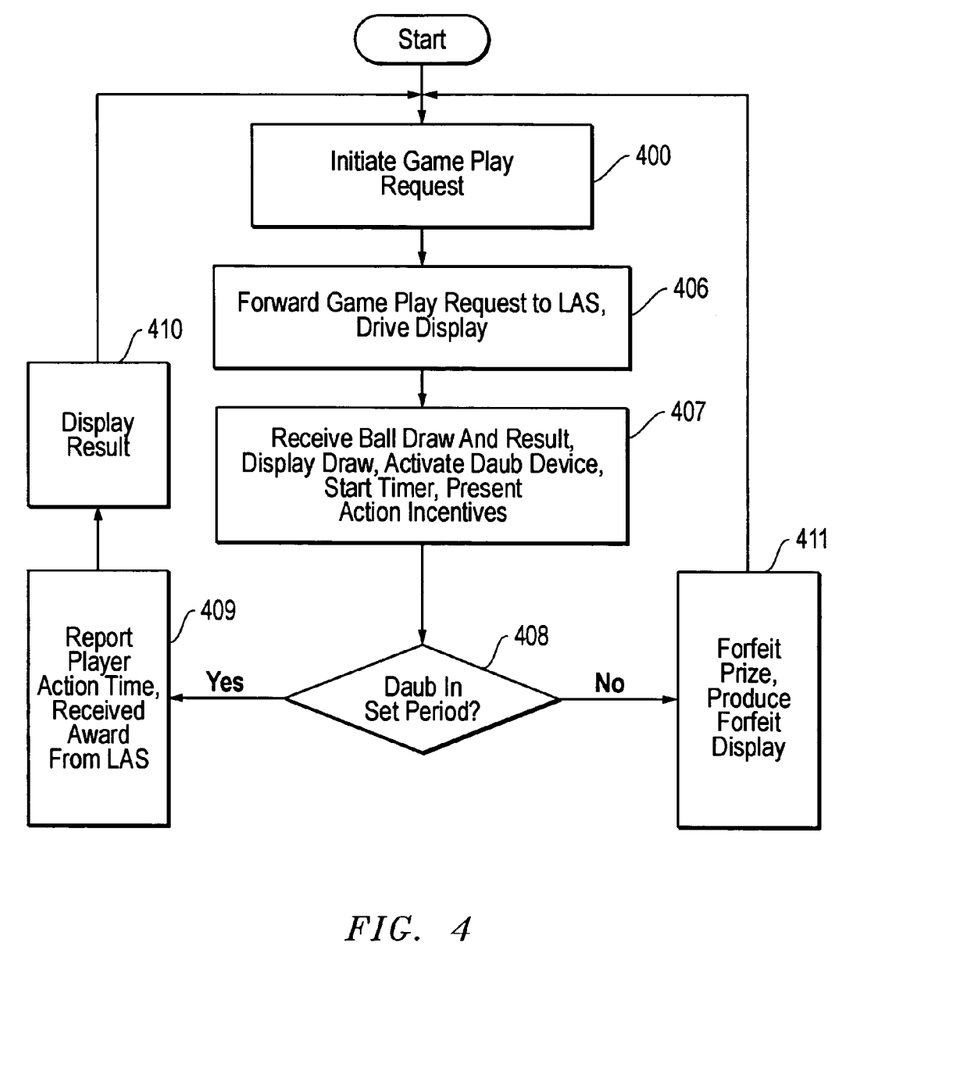
FIG. 4 is a flowchart providing a high level description of a process executed at the electronic player stations according to the present invention.

FIG. 4 shows a process that may be performed at an EPS 103 according to the invention in the context of an electronic bingo game. After EPS 103 is initialized and activated for use by a player, the process at the EPS includes initiating a game play request as shown at process block 400. This step is performed in response to one or more inputs made by the player at the EPS 103. This game play initiating step may include a process for assigning a bingo card representation for the game play and a process for assigning a wager amount for the game play. These processes and conceivably others may be in addition to some final input by the player to place the assigned bingo card in play for the determined wager amount. It should be noted that the bingo card assignment process, wager determination process, and/or process for putting the assigned card in play may each involve one or more player action events that are monitored according to the invention. That is, the speed at which a player completes these steps may be monitored according to the present invention and used in determining or setting a final result of the game play.

Once the player has, in one fashion or another, made an input at EPS 103 to enter their card or cards in a bingo game administered through the gaming system (100 in FIG. 1) as indicated at process block 400, the EPS forwards a game play request to the respective LAS 102 as indicated at process block 406 in FIG. 4, and preferably drives a display showing some type of entertaining graphics pending the return of the result for the player's card(s) in the bingo game. For example, EPS 103 may be configured to display results associated with the underlying bingo game in terms of reel stop positions for a reel-type gaming machine (slot machine). For this type of result display, the step of driving the display at process block 406 may include showing a number of reels spinning to imitate the spinning reels one would see immediately after activating a traditional reel-type gaming machine. Alternatively, results from the bingo game may be displayed in some other entertaining fashion such as a horse or dog race for example, and the step of driving the display shown at process block 406 in FIG. 4 may include an initial portion of the race. In yet other forms of the invention, results may be displayed as in a traditional bingo game and the step of driving the display shown at process block 406 in FIG. 4 may include simply displaying the bingo card that has been assigned the player and placed in play. Even where the results of the bingo game may be shown with entertaining graphics unrelated to the bingo game, a portion of the display at EPS 103 is preferably devoted to a representation of the bingo card in play and ball draw for the bingo game in which the card is entered.

The nature of the communication forwarding the game play request to LAS 102 will depend upon a number of factors. For example, the communication may include an actual card definition for each card that defines the respective player's bingo card which is in play for the game. Alternatively, where card definition files are available at the various system components, the communication may include a card identifier for each card placed in play and this identifier may be used to locate the actual card definition. In still other forms of the invention, the player's bingo card or cards placed in play from EPS 103 may have been known to the LAS or CGS from the card assignment process. In this case, the game play request sent to LAS 102 at block 406 in FIG. 4 may not include even an identifier for the card(s) in play, but merely some signal for the LAS to place the card(s) in play for the requesting player.

Regardless of how EPS 103 drives the display at process block 406 in FIG. 4, the EPS receives a ball draw for the game in which the player has been entered and, for each card placed in play, a result for the game play which has been identified at the LAS 102 or CGS 101, as described in detail below. The receipt of the ball draw and result is shown at process block 407 in FIG. 4. The result received at EPS 103 represents the result of the respective player's card in the bingo game in which the player's card has been entered. As in any bingo game, the result is associated with some pattern and/or sequence of spots on the player's bingo card that have been matched by designations in the ball draw. However, it will be appreciated that the result communicated to EPS 103 at process block 407 is preferably some result code that represents the actual bingo result. The ball draw and result may be sent to EPS 103 separately or in a single communication. In either case, the preferred form of the invention displays the ball draw on the display associated with the EPS prior to the time the respective game result is displayed.

In some preferred forms of the bingo gaming system, the bingo player must claim their bingo prize associated with a winning or game ending result by taking an appropriate player action. Other forms of bingo systems present the ball draw and thus the game results to the player in two or more distinct groups, and require some player action after each group is presented to the player. In systems in which the player must claim their prize or take some other action in the course of the game, the EPS process may include activating or at least monitoring a prize claiming or daub display or input device at EPS 103. This prize claiming or daub input activation or monitoring is included at process block 407 in FIG. 4 along with the activation of a timer which measures the time between when the prize claiming or daub display or input device is activated or monitored for an input and the time that the player takes action by making the appropriate input. This time represents the player action time for that player action event.

In some forms of the invention, the rules of play make it apparent to the player that taking action quickly in the game will benefit them. Thus, the players are aware of the action incentives from rules shown at the EPS 103 and/or elsewhere at the gaming facility. Some preferred forms of the present invention may actually notify a player of an action incentive at the time of the player action event. In these forms of the invention, the process includes activating or producing some display or device at the respective EPS 103 indicating to the player that there is some benefit associated with taking action quickly. This step would be in addition to merely activating the player input device to allow the player to make the appropriate input. For example, when a player must take some action to proceed in a game, EPS 103 may produce a display with suitable graphics and a message such as "DAUB NOW FOR BONUS ROUND PLAY" or "DAUB NOW FOR SPEED PLAY AWARD." These displays actually present the action incentive to the player and encourage the player to take the appropriate action more quickly. It will be noted that these two different example messages indicate two different types of action incentives. The first message indicates that acting quickly will or may entitle the player to participate in some sort of bonus round, which may be a separate bingo game, or some other type of game. The latter example message above indicates that acting quickly will effect the award or result of play in that particular game, without any separate game or bonus round.

If the player claims their prize by taking the required player actions within the set period of time, as indicated by decision block 408 in FIG. 4, EPS 103 determines the player action time and reports it to the respective LAS 102, as illustrated by process block 409. Also shown at process block 409, EPS 103 may receive the player's award from LAS 102 based on the player action time. In other forms of the invention, the EPS 103 itself may be able to identify the appropriate award or result of the game for the player based on the underlying game result that has already been communicated to the EPS and based on the player action time measured at the EPS. In any event, the results of the game are preferably displayed to the player as indicated by process block 410. In the example described above in which the results may be displayed by reel-type or slot machine graphics, the display at EPS 103 may show reels stopped in particular positions that together correspond to the result achieved by the player in the bingo game. In the example where the results are shown by a horse or dog race, EPS 103 may show a particular horse or dog in a win, place, or show position corresponding to the result the player has achieved in the bingo game. Where the speed at which the player takes the appropriate action has entitled them to some enhanced award, the enhanced award may be communicated to the player through the regular presentation for the game or in a separate display or separate but related display. For example, a reel-type display for a given result in the game may be dictated by that result regardless of how quickly the player acts. However, an enhanced award for rapid play in the game may be shown with a separate "bonus reel" or "speed reel" or with some other graphic that is used to communicate the enhanced award to the player.

In the event the player at EPS 103 does not take the required action to claim the prize within the set period of time, the prize associated with the player's result in the bingo game may be forfeited as indicated at process block 411. In the case of a forfeited prize, EPS 103 may also produce a suitable display to indicate to the player that the prize associated with the play in the bingo game has been forfeited.

There are a number of ways to calculate the player action time and this disclosure is not limited to any particular methods for computing or measuring this time. For example, the player action time might be measured from the time a required player action event occurs to the time until the player action is completed or it may be measured from the time the player enters a game play request to the time the player completes all required player actions. Additionally, the player action time may also be measured from the time the processor in EPS 103 executes the communication from LAS 102 associated with a game ending pattern to the time the player takes the appropriate player action. In another embodiment, the required player action time can be measured from the time an action incentive communication is sent from the processor of EPS 103 to the display monitor of the EPS until the player completes the required player actions. It should also be noted that player action time is not limited to a single game. Rather, player action incentives may be provided according to the invention over the course of several games, and thus the player action time may need to be measured for several distinct games. For example, a player may be entitled to play in a bonus game if they take the appropriate player actions in some minimum period of time for, say five or some other number of games in a row.

The operating system associated with EPS 103 may influence the measurement of the player action time according to the present invention. For example, the operating system in use by the processor at EPS 103 may place the communication identifying a result in the bingo game into a queue of actions to be executed. Other operating systems may execute a game result identifying communication on receipt. Preferred forms of the present invention employ a player action time measurement arrangement or technique that removes operating system or instruction execution differences from the time measurement. In particular, starting the player action time measurement from the time the EPS display 305 receives or is sent the data to produce the player action prompting graphic tends to eliminate data processing variations from the player action time measurements. In this way, the player action time or times measured and used by the system in identifying or determining results in the game fairly represent the actual time taken by the player to take the appropriate player action or actions in the game.

In some instances, the result from the bingo game may not be associated with any prize. If this is the case, the process at EPS 103 may not activate a daub or prize claiming input device, and may not wait for an input before displaying the result. Rather, the process at EPS 103 may simply include displaying the non-winning or non-game ending result immediately after receiving it from LAS 102 without further intervention on the part of the player. Even if there is no prize associated with a given result in the underlying game, the player may still be required to take some action and the present invention may offer action incentives to act quickly. This use of action incentives acts to train the player to act quickly and also increases player excitement by allowing the player to win some award or at least allowing them a chance at receiving some award even where they do not win in the underlying game.

Another embodiment of the invention includes the situation where the player identified with the game ending result does not take the appropriate required player actions, but this inaction does not result in the forfeiture of their prize. In these alternative forms of gaming systems, the player's failure to take the required player actions may cause the underlying bingo game to proceed with the ball draw (or additional numbers in the already defined ball draw sequence) until another game ending result is produced, thus generating an additional player action event. The new game ending winner may then be given the opportunity to claim the winning prize. If this additional player fails to take the required player actions at this point, the game may proceed again until another new apparent game ending winner is identified. With each identification of an additional apparent game ending winner and/or each identification of any result in the game, the system may present action incentives and thus monitor an additional player action time and use that additional player action time in determining the final result or award to the player.

There may be great variation in the player actions necessary to claim a game ending result or other result in a bingo game conducted according to the invention. For example, where the player need only operate some control once to claim their result, the operation of the control would be referred to as a player action. As another example, where the player must operate multiple controls or operate the same control multiple times, all of this activity could also constitute a player action. Even where multiple actions are required in order for the player to see their result, the invention may include measuring the time required for each action separately. Each individual player action time or any of the player action times in the series of player actions may be used to affect the award or result of the game play according to the present invention.

Figure 5:
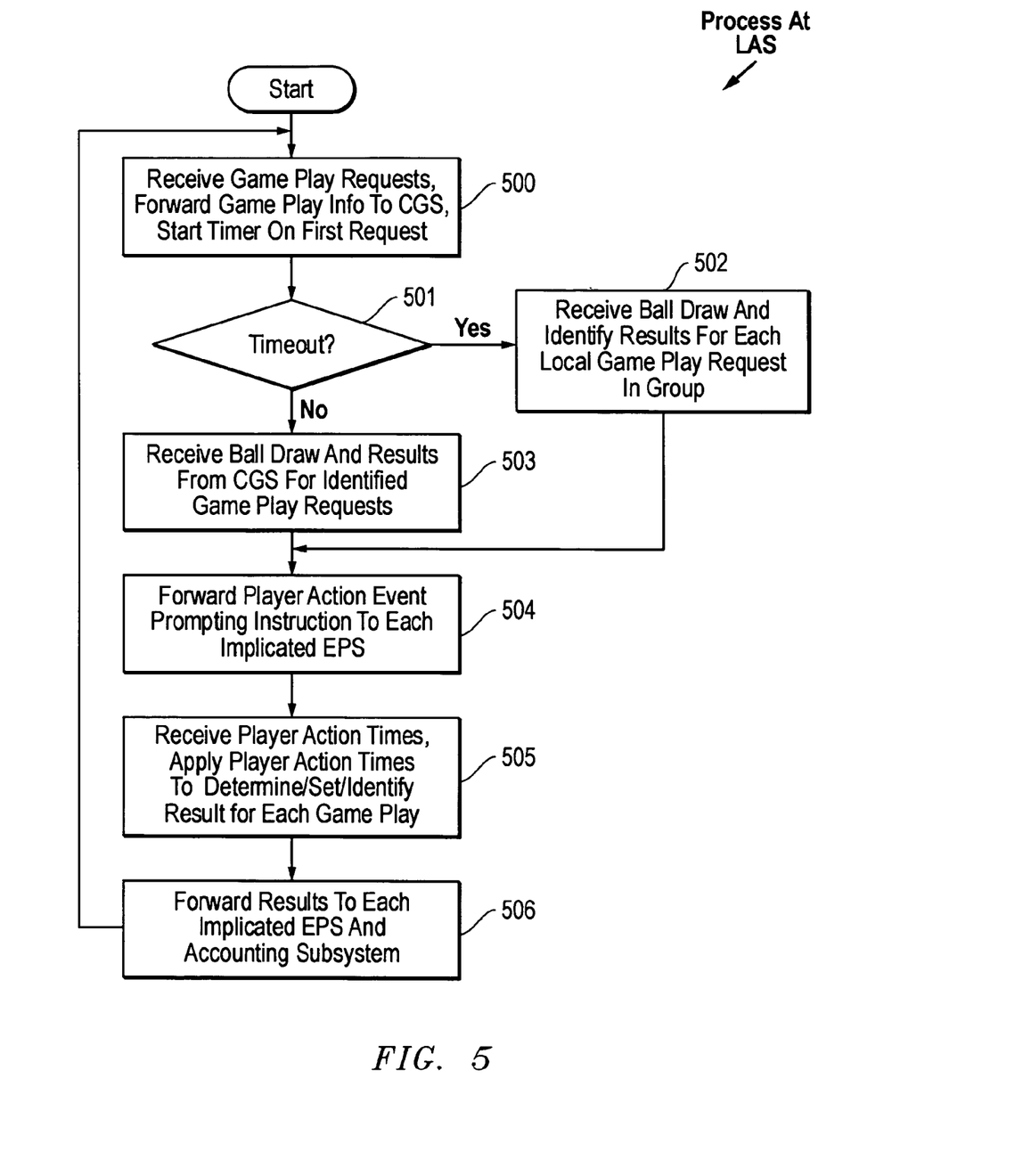
FIG. 5 is a flowchart providing a high level description of a process executed at the local area servers according to the present invention.
Figure 6:
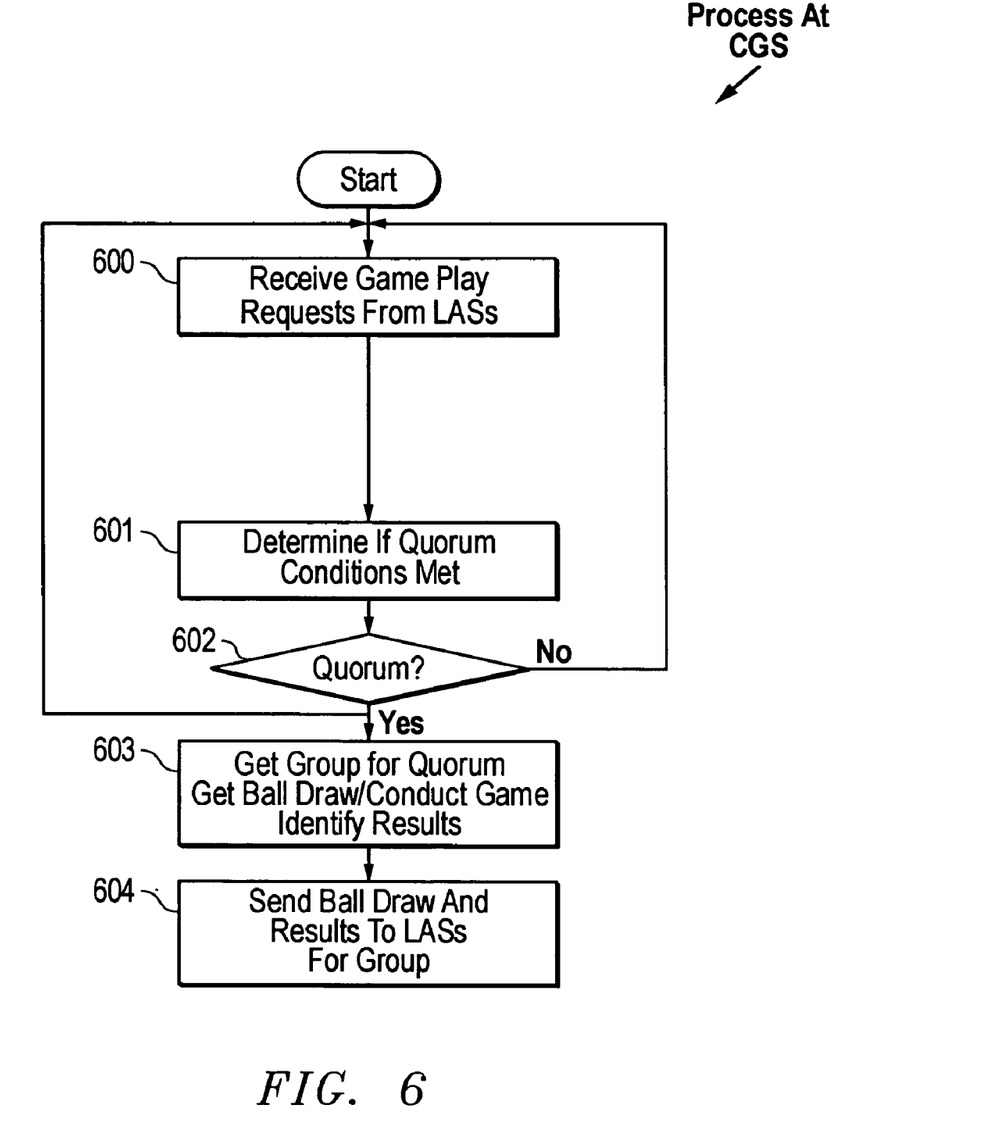
FIG. 6 is a flowchart providing a high level description of a process executed at the central game server according to the present invention.

FIGS. 5 and 6 may be used to describe one preferred arrangement for cooperation between the LASs 102 and the CGS 101 in system 100 shown in FIG. 1, and to describe the processes performed at the LASs 102 and CGS 101 in that arrangement. In this particular arrangement for cooperation between LASs 102 and CGS 101, the CGS always groups players or game play requests for each game available through the system. The group of players or game play requests for a game administered through system 100 will be referred to in this disclosure as a quorum and will comprise some minimum number of players that may be a fixed number, a range of numbers, or a number determined dynamically depending upon certain system operating parameters and/or the nature of the game play requests.

Referring now to FIG. 5, each LAS 102 receives a game play request from one of the EPSs 103 serviced by a respective LAS 102 and immediately forwards the game play request to CGS 101 along with information associated with the game play request such as a card definition or card identifier from which the card definition may be determined. This receiving and forwarding step is shown at process block 500. As indicated at block 500, the LAS process may also include starting a timer on the receipt of the first game play request from a local EPS 103 for a given game. If a timer set at process block 500 times out before CGS 101 returns a ball draw and results for the game play requests which have been collected and forwarded to the CGS as indicated at decision block 501, LAS 102 may attempt to play the game locally if possible as indicated at process block 502. A timeout may occur if the communications link has been broken with CGS 101, or if the communications link has been degraded in some fashion. In this case it is necessary for LAS 102 to attempt to play games with only local players. Of course, if quorums cannot be produced locally with sufficient speed, LAS 102 may simply notify the EPSs 103 that new games are not presently available, or if the situation is transient, return even money results to the requesting players.

In situations where no timer is used at LAS 102 or a timeout has not occurred at decision block 501, the LAS receives a ball draw for the game play requests it has forwarded to CGS 101 along with the results of the game for those game play requests/players, as shown at process block 503. The actual communications between LAS 102 and CGS 101 may require that the ball draw is sent in one or more communications and the results are sent as a separate communication or communications, otherwise both the ball draw information and results for the game may be sent as a single communication. As indicated at process block 504, the LAS 102 forwards some player action event prompting instruction to each local EPS 103 participating in the given game. This instruction may be associated with data for the ball draw for the game and a result for the respective game play. In the illustrated form of the invention, LAS 102 receives player action times from the respective EPSs 103 implicated in the given bingo game as indicated at process block 505, and applies the respective player action times to determine, set, or identify the result for each respective game play. As shown at process block 506, LAS 102 then forwards the respective game play result to the respective EPS 103 from which the game play request was initiated. LAS 102 may also communicate these results to any game accounting system separate from the LAS or incorporated with the LAS.

It should be noted that the particular sequence of communications between LAS 102 and EPSs 103 and the content of the communications may vary greatly within the scope of the present invention. For example, step 504 in FIG. 5 may include communicating the ball draw with the game and raw or preliminary results to the EPSs 103. The results are raw or preliminary at this point in the sense that the player action time has not yet been measured or applied to determine, set, or identify the final result in the game. In fact, the steps of receiving a player action time for the respective EPS 103 and applying the player action time to produce the final result of the respective game play may be performed at the respective EPS 103 rather than at the LAS, thus obviating the LAS steps shown at 505 and 506. Alternatively, the LAS 102 may still receive and apply the player action times as indicated at 505 and 506 even though the results in the underlying game are already communicated to the respective EPS 103 at step 504. In yet other forms of the invention, LAS 102 may simply relay player action time data to CGS 101 for the CGS to apply the player action times and determine, set, or identify the final result for each respective game play. This latter arrangement would require that this final result data be communicated back to the respective EPSs 103, preferably through the respective LASs 102.

The same basic sequence of providing action incentives applies regardless of the specific hardware used to accomplish each particular task. In particular, the invention first includes measuring a player action time and then applying the player action time in determining, setting, or identifying the result of each respective game play or a result associated with some group of game plays.

FIG. 6 shows a process at CGS 101 that may be used in connection with the LAS process shown in FIG. 5. The process for CGS 101 includes receiving game play requests from the various LASs 102 as shown at process block 600 in FIG. 6. Process block 601 indicates that the process also includes determining if the conditions for a quorum exist. As shown at decision block 602, if the system determines that conditions for a quorum have not been met for the game play group in question, the process returns back to process block 600 to receive further game play requests from LASs 102. However, if conditions for a quorum have been met, CGS 101 obtains or produces a ball draw for the game and identifies the results associated with that game by comparing the ball draw with the bingo cards associated with the game play requests which make up the quorum. These functions are shown at process block 603 in FIG. 6. As shown at process block 604, CGS 101 also communicates the ball draw and results for a given game to the LASs 102 implicated for the particular game play group for which a game has been played or initiated and results identified.

Figure 7:
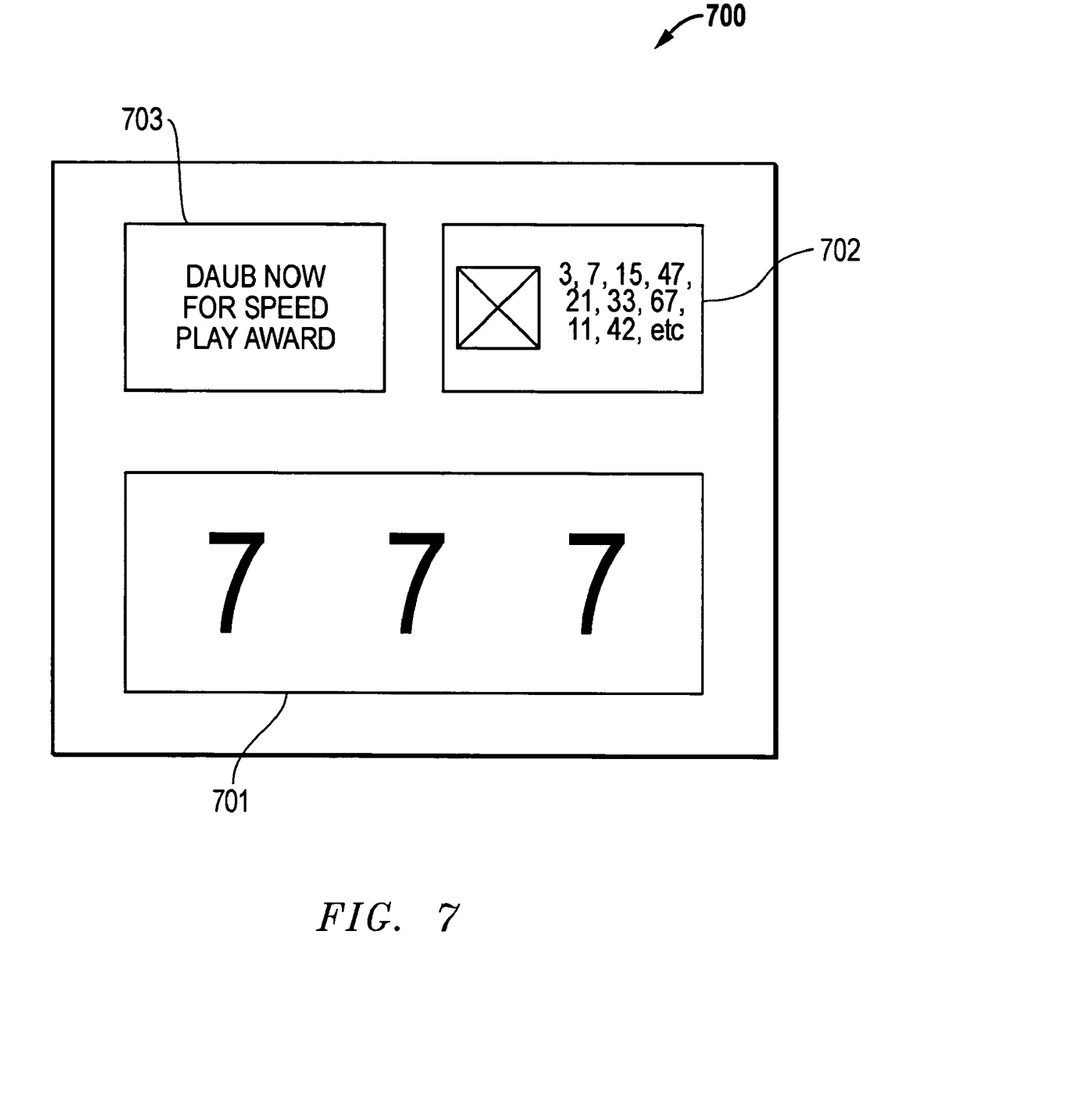
FIG. 7 is a representation of a graphic display that may be used in a gaming system according to the present invention to present a player with action incentives in the course of play.

FIG. 7 shows a representation of a graphic display 700 that may be used to notify a player that action incentives are in effect. Display 700 includes a game result display area represented by three-reel display 701. This display is preferably a video representation of a reel type machine rather than an actual reel type device. Display 700 also includes an area 702 for displaying other information regarding the game play results, such as a ball draw and bingo card for bingo type games. In accordance with one preferred form of the present invention, display 700 further includes an area 703 reserved for a graphic that presents or announces the action incentives and thus encourages the player to take action quickly.

Action incentives may take a variety of forms, as briefly discussed earlier. The EPS 103s may present the action incentives to the player visually, audibly, or both. Action incentives may be constant for each player, constant for certain players, or may be intermittent. In particular, action incentives according to the invention may be applied randomly at different times so that players do not know when the action incentives apply. Applying action incentives in this fashion has the effect of encouraging all players to act quickly on the chance that the action incentives apply to their particular game play or plays. The action incentives may or may not encompass participating in a bonus game. For example, a player may receive a bonus prize based on how quickly they complete the player actions, or the predetermined game play result award amount may just be reduced depending on how long it takes the player to claim the prize. In addition, the presentation may take the form of a secondary game, such as a game of chance (e.g. a reel-spin game) or a game of skill. For example, EPS 103 may display on the monitor a game of skill where cross hairs move from a representation of one bonus award or award level to another in order of descending value. The player has an incentive to take the required player action while the cross hairs are aligned with the highest award value. The action incentives could also be in the form of the ability to enter into a raffle with a drawing taking place at a later time or as part of an accumulator bonus or bonus game arrangement. For example, rapid play in a particular game may cause the player to be awarded a speed play graphic symbol at their respective EPS 103. Accumulating a certain number of these speed play graphic symbols may entitle the player to a bonus prize or may entitle the player to play some bonus game and compete for a bonus prize. Thus, a single quick play may not entitle the player to any monetary value. Nevertheless, the present invention provides action incentives in the form of some benefit available after multiple rapid plays.

Additionally, it should be noted that if the action incentives include a secondary game, the display of the game is preferably arranged so that a player's participation in the game does not interfere with the underlying or original game. This format prevents a delay in the presentation of results to the other players in the underlying game that would occur if they had to wait for their results until after one or more fellow players finishes playing the bonus game. Some secondary games may be quick games, such as the cross hairs game described above, and the completion of the player actions stems from the player's participation in the game.

Another embodiment of the invention includes providing action incentives only to a certain subset of players in a given game. For example, a system according to the invention may measure player action time and provide action incentives only to a player in a bingo gaming system who has achieved the apparent game ending pattern and will obtain a corresponding game ending result if the player takes the appropriate action to claim the game ending result. Providing action incentives in this case is particularly important to help encourage the player to claim the game ending result quickly so that the game can quickly end and the remaining players in the game can obtain their results. Assuming the results in the underlying game are concealed from the various players until all required player actions are taken, each player still has an incentive to take their player actions quickly on the chance that their result is indeed one in which a quick player action time will have some beneficial effect.

In one preferred form of the invention, the action incentives involve some relatively higher award or result in the underlying game based upon player action time. For example, player action time may be divided into three groups, group I comprising times less than a quarter of a second, group II comprising times between a quarter of a second and a second, and group III comprising all times over a second. The game may be configured so that the maximum award for the game play is awarded to players producing the player action in the group I time. Some lesser award for the game play is awarded to players producing the player action in the group II time, and the minimum award is given to players producing the player action in the group III time.

Many of the process steps described in FIGS. 4-7 are preferably performed by processing devices, such as those described in FIGS. 1-3, under the control of operational program code. For example, action incentive code can be executed upon receipt of the game play results from LAS 102 to control or direct the presentation of action incentives at an EPS 103. The action incentive code would also be responsible for displaying that action incentives are applicable to a specific EPS 103 if the existence of action incentives is displayed in an audio-visual manner (i.e. not physically posted on the gaming device or at some other location). The action incentive code may also actually apply the reported player action time to produce the final result of the game play request. Player action time monitoring code can be used to measure player action time as indicated at 407 and 408 in FIG. 4. This program code may also report this time to LAS 102 as, illustrated in blocks 409 and 505 in FIGS. 4 and 5 respectively.

It should be noted that this description of the invention does not include a discussion regarding the determination of a quorum of players for a particular game, nor does it discuss the data structures used to define the bingo game card faces and store a number of ball draws. In addition, the application does not address the differing payout tables that could be used with the invention. These issues are already thoroughly covered in the patents and patent applications previously incorporated by reference in this application, and are thus omitted from this disclosure to avoid obscuring the present invention in unnecessary detail.

The above described preferred embodiments are intended to illustrate the principles of the invention, but not to limit the scope of the invention. Various other embodiments and modifications to these preferred embodiments may be made by those skilled in the art without departing from the scope of the invention. For example, although the primary example described above relates to a multi-player gaming system, and particularly a bingo gaming system, the invention may be applied with stand alone, single-player gaming machines. In these applications, action incentives may simply encourage single-player rapid play. An example of such a stand alone gaming machine application might be in traditional reel-type or virtual reel-type gaming machines or slot machines. The player action incentive in this case may be a play in a bonus game if the player plays some number of regular games in short succession or if the player consistently initiates new plays quickly.

The invention claimed is:

1. A method including:
(a) identifying a player action event for a player during a game, the game requiring a wager and having at least one potential result that is associated with a prize, and the player action event being associated with a period of time for completing a player action;
(b) measuring a player action time for the player, the player action time for the player comprising an amount of time that elapses between the player action event and the point in time that the player completes the player action within the period of time for completing the player action; and
(c) applying the player action time to identify an award for the player from among at least two different potential awards other than no award, the award identified for the player comprising a first one of the potential awards when the player action time is within a first range and comprising a second one of the potential awards when the player action time is within a second range.

2. The method of claim 1 wherein the player action includes an input to claim a game ending result associated with a game ending pattern that the player has achieved in the game.

3. The method of claim 1 further including:
(a) identifying an additional player action event for an additional player in the games, the additional player action event being associated with an additional period of time for completing an additional player action;
(b) measuring an additional player action time for the additional player, the additional player action time comprising an amount of time that elapses between the additional player action event and the point in time that the additional player completes the additional player action within the period of time for completing the additional player action; and
(c) applying the additional player action time to identify an award for the additional player from among the at least two different potential awards, the award identified for the additional player comprising the first one of the potential awards when the additional player action time is within the first range and comprising the second one of the potential awards when the additional player action time is within the second range.

4. The method of claim 3 further including producing a display at a player station for the additional player at the time of the additional player action event to notify the additional player of an action incentive.

5. The method of claim 1 further including producing a display at a player station for the player at the time of the player action event to notify the player of an action incentive.

6. The method of claim 1 wherein the award identified for the player includes an opportunity to participate in a bonus game.

7. The method of claim 1 wherein applying the player action time to identify the award for the player includes decreasing the value of a preliminary result for the player in the game.

8. The method of claim 1 wherein applying the player action time to identify the award for the player includes increasing the value of a preliminary result for the player in the game.

9. The method of claim 1 wherein the game is a bingo game.

10. The method of claim 1 further including identifying the award for the player based at least in part on a player action time for the player in a different game.

11. The method of claim 1 wherein measuring the player action time includes activating a timer.

12. An apparatus including:
(a) a processing device, the processing device for (i) collecting a number of game play requests in a game which requires a wager, which has at least one potential result that is associated with a prize, and which involves for a respective player associated with one of the game play requests a player action event associated with a period of time for completing a player action, for (ii) conducting the game for the collected game play requests, for (iii) identifying a result in the game for the respective player, and for (iv) receiving a player action time for the respective player and applying the player action time to identify an award for the respective player from among at least two different potential awards other than no award, the award identified for the respective player comprising a first one of the potential awards when the player action time for the respective player is within a first range and comprising a second one of the potential awards when the player action time for the respective player is within a second range,; and
(b) a player station being connected for communication with the processing device, the player station for (i) producing the game play request associated with the respective player, for (ii) measuring the player action time for the respective player, the player action time for the respective player comprising an amount of time that elapses between the player action event and the point in time that the respective player completes a player action within the period of time for completing the player action, for (iii) communicating the player action time to the processing device, and for (iv) displaying the award identified for the respective player.

13. The apparatus of claim 12 wherein the player station is also for producing a display at the time of the player action event to notify the player of an action incentive.

14. The apparatus of claim 13 wherein the player station includes a player action time measurement arrangement for measuring the player action time for the respective player by (i) identifying a time associated with receiving the data for presenting a graphic at a display for the player station and by (ii) identifying a time associated with an input entered by the respective player at the player station in response to the player action event.

15. The apparatus of claim 12 wherein the processing device is also for determining a result in the game for an additional player based at least in part on a player action time for the additional player.

16. The apparatus of claim 12 wherein conducting the game for the collected game play requests includes matching a series of designations against a respective bingo card representation for each game play request.

17. The apparatus of claim 12 wherein the processing device applies the award identified for the respective player to modify the result for the respective player and thereby determine a final result.

18. The apparatus of claim 12 wherein the processing device identifies the award for the respective player based at least in part on a different player action time for the respective player in a different game.

19. A program product including:
(a) player action time monitoring code for being executed to (i) identify a player action event for a player during a game, the game requiring a wager and having at least one potential result that is associated with a prize, and the player action event being associated with a period of time for completing a player action, to (ii) measure a player action time for the player, the player action time for the player comprising an amount of time that elapses between the player action event and the point in time that the player completes the player action within the period of time for completing the player action, and to (iii) communicate the player action time to a processing device for identifying an award for the player; and
(b) action incentive code for being executed to receive the player action time and apply the player action time to identify an award for the player from among at least two different potential awards other than no award, the award identified for the player comprising a first one of the potential awards when the player action time is within a first range and comprising a second one of the potential awards when the player action time is within a second range.

20. The program product of claim 19 wherein the action incentive code is also executed to produce a display at a player station for the player at the time of the player action event to notify the player of an action incentive.

21. The program product of claim 19 wherein the first potential award comprises an amount by which to modify the value of a preliminary result for the play of the game.

* * * * *